United States Patent
Kafri

[11] Patent Number: 5,191,603
[45] Date of Patent: Mar. 2, 1993

[54] MESSAGE RECEIVING APPARATUS

[76] Inventor: Oded Kafri, 3 Ehud St., Beer-Sheva, Israel

[21] Appl. No.: 642,081

[22] Filed: Jan. 16, 1991

[30] Foreign Application Priority Data

Jan. 30, 1990 [IL] Israel ......................... 93217

[51] Int. Cl.$^5$ ........................................... H04M 11/00
[52] U.S. Cl. ..................................... 379/98; 358/442; 379/100
[58] Field of Search ......................... 379/100, 96–98, 379/93; 358/400, 401, 437, 442, 468

[56] References Cited

U.S. PATENT DOCUMENTS

| | | | |
|---|---|---|---|
| 4,652,933 | 3/1987 | Koshiishi | 358/442 |
| 4,660,218 | 4/1987 | Hashimoto | 379/100 |
| 4,700,238 | 10/1987 | Sugiyama | 358/401 |
| 4,816,911 | 3/1989 | Kirsch et al. | 358/400 |
| 4,910,607 | 3/1990 | Kita et al. | 358/400 |
| 4,914,688 | 4/1990 | Kobayashi et al. | 379/97 |
| 4,930,017 | 5/1990 | Izawa | 358/437 |
| 4,991,200 | 2/1991 | Lin | 379/100 |
| 5,018,080 | 5/1991 | Inoue | 358/401 |
| 5,072,303 | 12/1991 | Silverberg | 358/442 |

FOREIGN PATENT DOCUMENTS 2183427 6/1987 United Kingdom ................ 379/100

*Primary Examiner*—James L. Dwyer
*Assistant Examiner*—Ning F. Chan
*Attorney, Agent, or Firm*—Merchant, Gould, Smith, Edell, Welter & Schmidt

[57] ABSTRACT

The invention provides a device to be connected to a telephone line and, alternatively, to a telephone set or a printer. The device comprises a switch device for automatically operating the one or the other connection according to the signals received through the line. When modulated telefax signals are received, they are transmitted to a modem which transforms the signals to sequential digital signals, these are stored in a buffer memory, at least to an extent corresponding to a line of print, and they are then transformed by a microcircuit to matrix digital signals, which are transferred to the printer. Fax messages transmitted through the telephone line are thus automatically printed out. The invention also provides a printer, which incorporates a modem, a buffer memory and microcircuit for performing the aforesaid operations, through which the printer may selectively be connected to a telephone line, and which may be by-passed to connect the printer to a computer. The invention also provides a message receiving system, which comprises a printer and a device for selectively connecting the system to a computer or to an interface interposed between the printer and a telephone line, which comprises a modem, a buffer memory a and microprocessor for converting sequential digital information to matrix digital information.

10 Claims, 1 Drawing Sheet

MESSAGE RECEIVING APPARATUS

FIELD OF THE INVENTION

This invention relates to message receiving apparatus, particularly for receiving messages sent from a telecopier machine. In this application the words "telecopier", "telefax" and "fax" will be used as synonyms, to indicate conventional telecopier apparatus.

BACKGROUND OF THE INVENTION

Various types of telecopier machines are known which are capable of sending and receiving fax messages through a telephone line. The machines ordinarily incorporate printers or, e.g., of the Dotmatrix type. The said printers have buffer memory means for storing digital information corresponding to one line of print and thereafter printing the said line while the information corresponding to another line is received and stored. In this specification the word "print" will be used to indicate any signs that are to be transmitted and received as part of fax messages, be they characters representing letters and words or drawings or graphic signs of any other kind. Telecopier machines are therefore capable of sending and/or receiving a message, and no message can be received while the machine is engaged in sending another one.

SUMMARY OF THE INVENTION

It is an object of this invention to provide fax message receiving means, which are continuously available for the receiving function and are not dependent on whether messages are or are not being sent.

It is another object of this invention to provide such means which are more economical and readily available than conventional telecopier apparatus.

It is a further object of the invention to provide fax message receiving means which can be coupled to a telephone line which is also used for ordinary telephone conversations.

It a still further object to provide fax message receiving means which can also be used for printing from a computer.

Other purposes of the invention will become apparent as the description proceeds.

According to an aspect of the invention, a telephone-printer interface device is provided, which comprises means for selectively, operatively connecting a telephone line terminal to a telephone set or to a printer, in accordance to a signal received through the telephone line, such means being known per se and being hereinafter called "automatic switch apparatus", and which further comprises demodulator means, operative when the telephone line is connected to the printer, for transforming modulated fax signals received through telephone lines to sequential or linear digital signals, buffer memory means for storing sequential or linear digital signals corresponding at least to a line of print, and microcircuit means for transforming sequential or linear digital signals to two-dimensional or matrix digital signals and for transferring the same to a printer.

The sequence of the said buffer memory and microcircuit means can be inverted, viz. the sequential or linear digital signals may be firstly transformed to two-dimensional, matrix digital signals and these latter can be stored in the buffer memory and recovered therefrom for transferral to a printer. This variant may apply to all the devices hereinafter described and claimed, and this is to be understood as implicit throughout the following description and claims.

Automatic switch apparatus are known in the art for automatically switching between a telephone set and a terminal device for data communication. Such an apparatus is described for instance in U.S. Pat. No. 4,660,218. As described in said patent and as practiced in the art, the device for data communication is a conventional telecopier machine.

In a preferred form of the invention, the interface device is additionally provided with means for directly operatively connecting it to a telecopier machine, while by-passing the modem, buffer memory and microcircuit means.

A type of printer, in connection with which the interface according to the invention may conveniently be used, are of the type which has a sliding printing head having a height which corresponds to the height of a line of print and a width that is small compared to the width of a line of print. The word "height" indicates herein the dimension parallel to the height of the sheet which receives the print, viz., to the direction in which the sheet advances from one line of print to the next. The word "width" indicates the dimension perpendicular to the aforesaid direction. The aforesaid printers will print, in every position of the printing head, a dot matrix composed of dots and blank spaces, viz. a matrix of ones and zeros. They may be, e.g., the so-called PC printers. The expression "sliding head printer" will indicated hereinafter any printer of the said or similar type. When such printer is used, as it normally is, in operative connection with a computer, this latter is programmed to translate characters of print to matrices and successively transmit the same to the printer, which will print them as it receives them. The printer will then be unable to interpret fax signals. On the other hand, were such a printer incorporated into a conventional telecopier machine, it would no longer be able to interpret signals received from a computer.

According to another aspect of the invention, the aforesaid modem, buffer memory and microcircuit means are incorporated in the printer and not in the interface device. The invention provides therefore a printer incorporating such means and means for connecting the same selectively, through said means, to a telephone line, with or without intervening automatic switch means for switching between a telephone set and the printer, or to a computer, while by-passing the modem, buffer memory and microcircuit means.

According to a further aspect of the invention, a message receiving system is provided, which comprises, in combination, a printer assembly, means for selectively operatively connecting said assembly directly to a computer or to interface means, and interface means comprising modem means, buffer memory means capable of storing the information corresponding to at least a line of print, and microprocessor means for converting sequential or linear digital information to two-dimensional or matrix digital information, said interface means being interposed between the printer assembly and the telephone line. Preferably the system further comprises an automatic switch device for automatically switching between a telephone set and the interface means. The printer assembly may be a conventional printer of the sliding head type or a conventional printer of any other type.

BRIEF DESCRIPTION OF THE DRAWINGS

The invention will be better understood from the following description of embodiments thereof, with reference to the appended drawings, wherein FIGS. 1 and 2 schematically represent, in block diagram form, two embodiments of the invention.

DESCRIPTION OF THE PREFERRED EMBODIMENT

Figure 1:
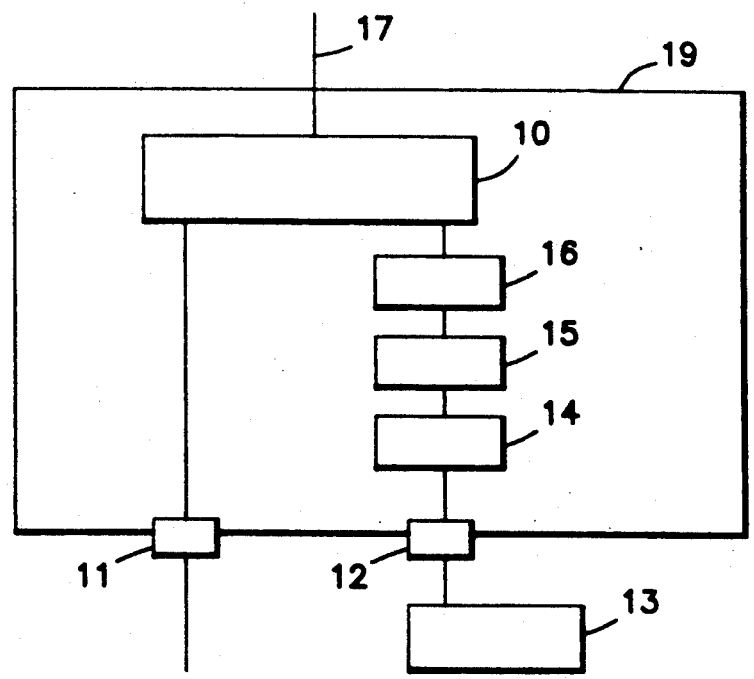

In the embodiment schematically illustrated by the block diagram of FIG. 1, numeral 19 generally indicates a telephone-printer interface device according to the invention which comprises an automatic switch apparatus, e.g. according to the aforesaid U.S. Patent or the like, indicated at 10, connected to a telephone line 17. The interface device 19 has a port 11 connectable to a telephone set, not shown and a port 12 connectable to a printer assembly 13, e.g. of the sliding head type but optionally also a laser or an ink-jet printer. The switch 10 is further connected to a modem 16, which in turn is connected to a buffer memory 15, capable of storing information corresponding to at least one line of print. This latter is connected to a microcircuit 14 programmed to convert sequential or linear digital information to two-dimensional or matrix digital information, said microcircuit being also connected to port 12. When a normal telephone conversation is received, switch 10 will connect the telephone line 17 to port 11. When a message is sent by a telefax machine, information corresponding to the message is transmitted in the form of modulated electrical signals through telephone line 17. Apparatus 10 will recognize, by means known in the art and described e.g. in said U.S. Pat. No. 4,660,218, and therefore herein not described nor illustrated, that such a message is being sent, and will connect the telephone line to modem 16, which operates what is known as a "handshake" with the fax from which the message originates, and further converts the modulated electrical signals to sequential or linear digital information. Said information is stored in buffer memory 15. Microcircuit 14 is so programmed as to elaborate the sequential or linear digital information corresponding to one line of print, and transform it into two-dimensional or matrix form. The matrix information is conveyed by said microcircuit to the printer 13, as a succession of matrices having the height of a line of print and the width of the matrix which the printing head of the particular printer in question is provided with. The printing head therefore will successively print the matrices corresponding to a line, whereafter the process will be repeated with the next line, the printing head normally inverting its motion. Printer 13 may be left switched on all the time without inconvenience, but it might be kept switched off and means might be easily provided by skilled persons for turning it on as soon as the automatic switch recognizes that a fax message is being received through the telephone line.

Figure 2:
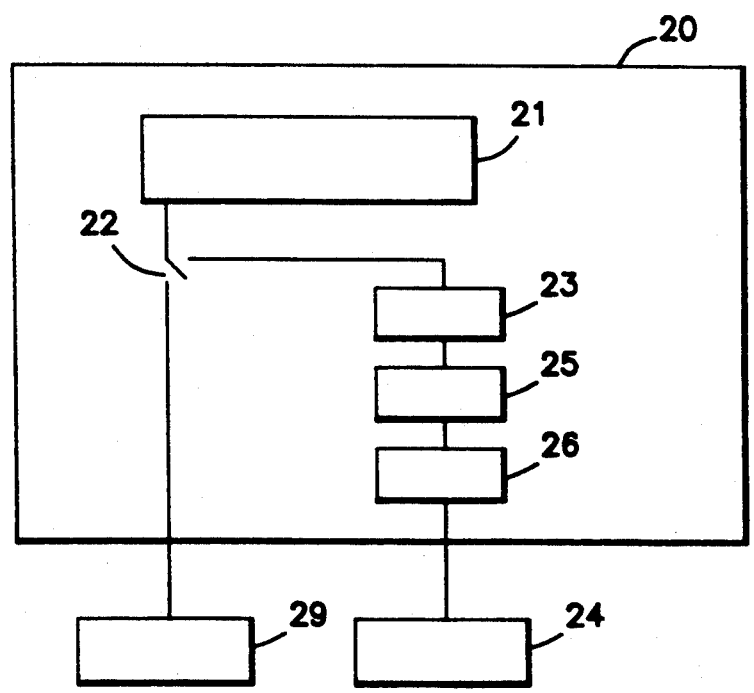

FIG. 2 schematically illustrates, in block diagram form, a printer according to an embodiment of the invention. The printer, generally indicated at 20, comprises a printer assembly 21, which is essentially the same that normally constitutes printers of the sliding head type to be used in connection with computers. Printer assembly 21 is connected to switch means, schematically indicated at 22, which can selectively operatively connect the assembly 21 to a computer, generally indicated at 29, or to a microcircuit 23, analogous to microcircuit 14 of FIG. 1 and having the same function. Microcircuit 23 is connected to buffer memory 25, analogous to buffer memory 15 of FIG. 1, and this latter to a modem 26, analogous to modem 16 of FIG. 1. This latter is connected to an automatic switch device 24, (or possibly directly to a telephone line, when this latter is not to be used for telephone conversations). When an automatic switch device is thus provided, it can be a completely conventional one, such as described in U.S. Pat. No. 4,660,218, wherein however the terminal device for data communication is the printer herein described, or it may be provided with means for selectively connecting it to such a printer or to a conventional telecopier machine, as desired.

An optional, preferred, additional feature of the invention overcomes a problem from which automatic switch devices according to the prior art suffer. When the automatic switch checks the telephone line, to establish whether a communication which is being received is an oral or a fax one, it holds the line and produces and sends backwards dummy signals similar to that of the exchange. If the automatic switch is connected in parallel to another telephone set, it is impossible to use this one as long as the said dummy signals are being sent, as anyone attempting to use it will hear said signals and will be unable to hold a normal conversation. This is a serious drawback, especially when several telephone sets are connected in parallel to the switch. The device according to the invention, in a preferred embodiment thereof, eliminates this drawback In said embodiment, the telephone sets in parallel to the automatic switch device 10 (FIG. 1) or 24 (FIG. 2) are connected to modem 16 (FIG. 1) or 26 (FIG. 2) and the modem is programmed to send to the switch a signal, which will stop the dummy ring, whenever it receives from any telephone set a predetermined signal, which may, e.g., that produced by dialing a given digit or number of digits. A person wishing to use a telephone set and hearing the dummy signal, will send to the modem said predetermined signal and will thus be able to hold a normal conversation, while the switch continues to operate in a normal way.

While particular embodiments of the invention have been described for purposes of illustration, these involve no limitation and the invention may be carried into practice by persons skilled in the art in a variety of ways without departing from its spirit or from the ambit of the claims.

I claim:

1. A telephone-printer interface device, comprising means for selectively operatively connecting a telephone line terminal to a telephone set or to a printer, in accordance to a signal received through the telephone line, modem means, operative when the telephone line is connected to the printer, for transforming modulated fax signals received through telephone lines to sequential digital signals, buffer memory means for storing sequential signals corresponding at least to a line of print, and dedicated microcircuit means for transforming sequential or linear digital information to two-dimensional or matrix digital information and means for transferring the same to the printer.

2. A device according to claim 1, additionally comprising means for directly operatively connecting the telephone line terminal to a telecopier machine, while bypassing the modem, buffer memory and microcircuit means.

3. Device according to claim 1, wherein the buffer memory means receive and store the two-dimensional or matrix digital information.

4. Device according to claim 1, wherein means are provided for transmitting to the modem means a predetermined signal from at least a telephone set and for stopping, in response to the reception of said predetermined signal, any dummy signals received by the telephone set.

5. A printer incorporating modem means for transforming modulated fax signals received through telephone lines to sequential digital signals, buffer memory means for storing sequential signals corresponding at least to a line of print, dedicated microcircuit means for transforming sequential or linear digital information to two-dimensional or matrix digital information, and means for connecting the same selectively, through said modem, buffer memory and microcircuit means, to a telephone line or to a computer, while by-passing said modem, buffer memory and microcircuit means, so that the operation of the computer is not interrupted when a fax signal is being received.

6. A message receiving system, comprising, in combination, a printer assembly, means for selectively operatively connecting said printer assembly directly to a computer or to an interface means which permits normal operation of the computer when a fax signal is being received, said interface means comprising a modem, a buffer memory capable of storing information corresponding to at least a line of print, and dedicated microprocessor means for converting sequential or linear digital information to two-dimensional or matrix digital information, said interface means being interposed between the printer assembly and the telephone line.

7. A system according to claim 6, further comprising an automatic switch device for automatically switching between a telephone set and the interface means.

8. A system according to claim 6, wherein the printer assembly is a conventional printer of the sliding head type.

9. A system according to claim 6, wherein the printer assembly is of the laser or ink jet type.

10. A system according to claim 6, wherein means are provided for transmitting to the modem means a predetermined signal from at least a telephone set and for stopping, in response to the reception of said predetermined signal, any dummy signals received by the telephone set.

* * * * *